(No Model.) 3 Sheets—Sheet 2.
M. G. BUNNELL.
MACHINE FOR MAKING AND REPAIRING ROADS.

No. 488,112. Patented Dec. 13, 1892.

Witnesses
W. Rossiter
F. C. Kennedy

Inventor
Morton G. Bunnell
By Chas. G. Page
Atty.

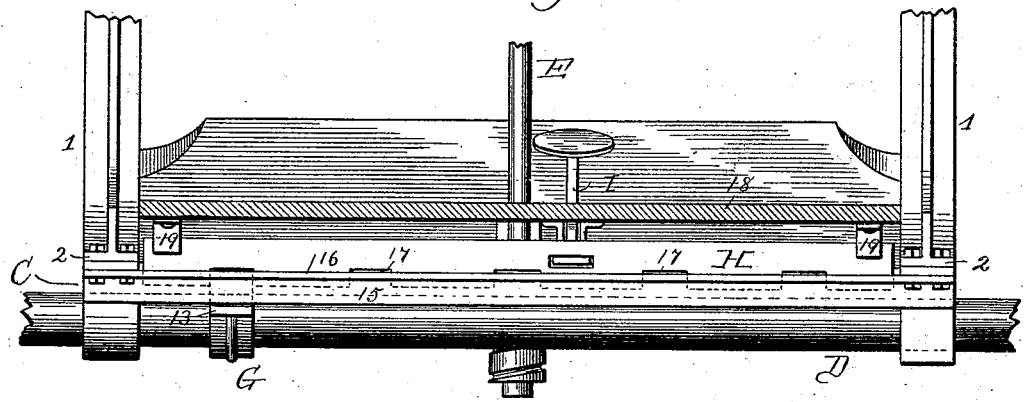
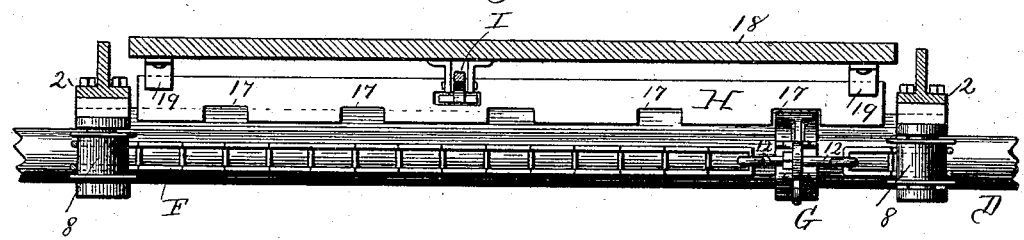
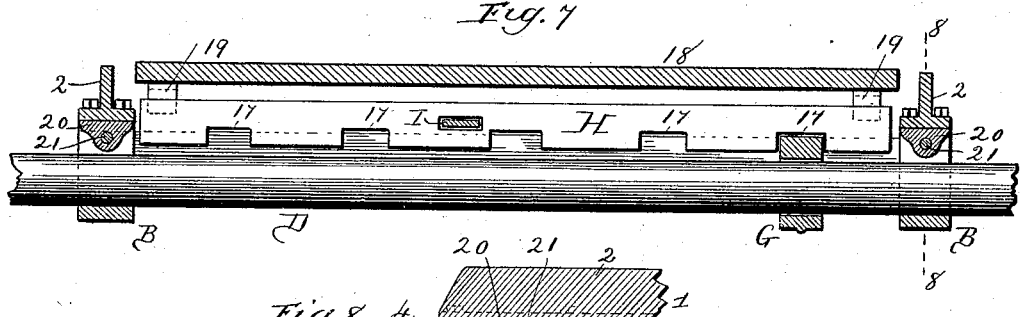
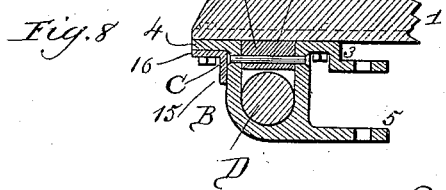

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 488,112, dated December 13, 1892.

Application filed May 12, 1890. Serial No. 351,507. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to a construction of a road-making and road-repairing machine embodied in Letters Patent of the United States, No. 427,740, dated May 13, 1890.

In my present application I have embodied and claimed certain additional features of improvement, as hereinafter set forth.

Figure 1:
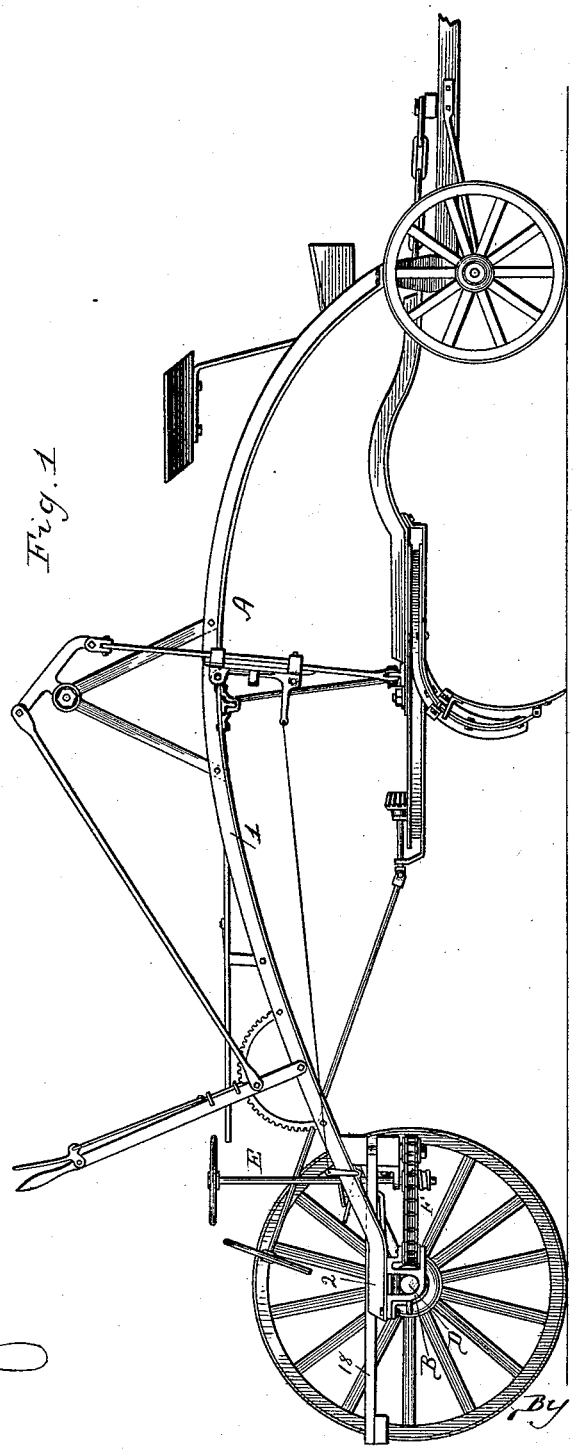
Figure 2:
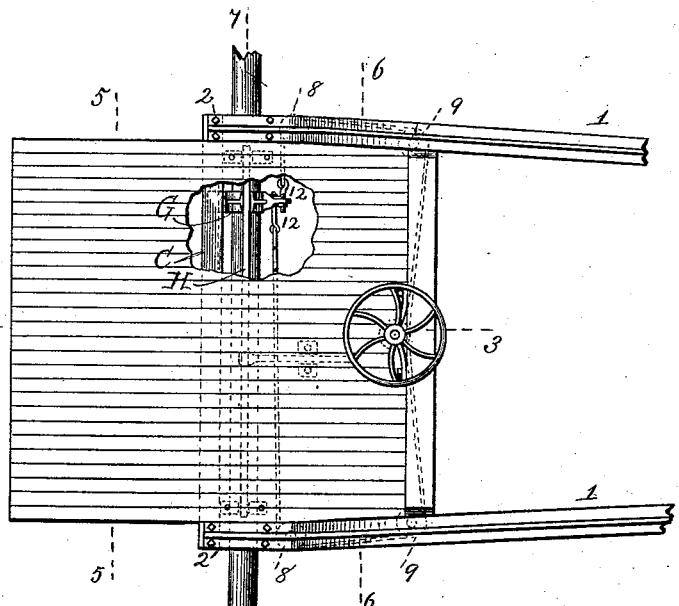
Figure 3:
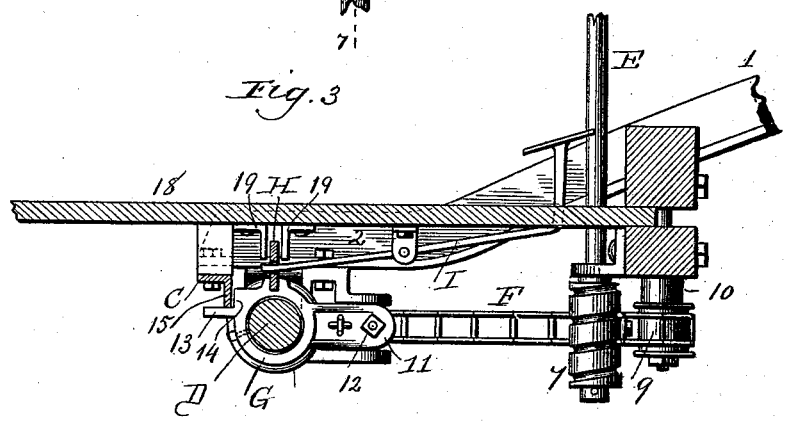
Figure 4:
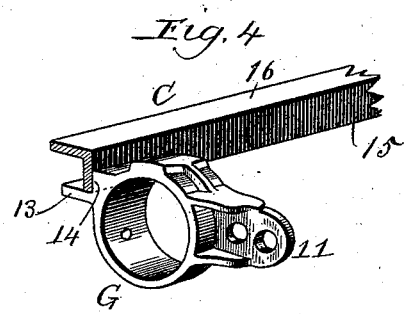

In the accompanying drawings, Figure 1 represents in side elevation a machine embodying my invention. Fig. 2 is a top plan view of the rear portion of the machine with a part of the rear platform and the end portions of the rear axle broken away. Fig. 3 is a vertical section on line 3 3 in Fig. 2. Fig. 4 represents in perspective a portion of the rear cross-bar C and the stop-collar G, so as to illustrate the relationship between the stop-collar and said bar. Fig. 5 is a vertical cross-section on line 5 5 in Fig. 2, looking forward. Fig. 6 is a vertical cross-section on line 6 6 in Fig. 2, looking to the rear of the machine. Fig. 7 is a vertical cross-section on line 7 7 in Fig. 2, the axle and locking-bar being, however, shown in elevation. Fig. 8 is a section taken through one of the axle-boxes and rear end portion of one of the side bars of the body-frame on a vertical plane indicated by line 8 8 in Fig. 7.

The body-frame A comprises in its structure the side bars 1 1, which at their rear ends are bolted upon boxes B for the rear axle. These side bars are preferably arched for the greater portion of their length, but have their rear end portions 2 made straight, so as to permit them to lie flat upon the axle-boxes, to which they are bolted, as aforesaid. Each box B is preferably formed of a single substantially-U-shaped casting provided with an upper forwardly-extending flange or ledge 3, an upper rearwardly-extending flange or ledge 4, and a lower forwardly-extending ledge or flange 5, all of which said ledges and flanges are preferably made integral with the body of the box. By such arrangement the rear-end portions 2 of the side bars can be fitted upon and bolted to the upper front and rear ledges or flanges 3 and 4 of their respectively-allotted boxes, while at the same time said ledges or flanges can be made to subserve other purposes, as follows: The two boxes are rigidly connected together by a cross-bar C, which is bolted to the under side of each one of the rear flanges 4 of the boxes, by which arrangement the bolts employed for holding the boxes and side bars together, can also be used for holding together the rear cross-bar and the boxes. In this way an exceedingly simple, compact, and durable structure is produced, and at the same time a simple and convenient stop device afforded by the arrangement of the cross-bar C, whereby the rear axle D, while being permitted to shift endwise through the boxes (or the boxes to shift along the rear axle,) can be held against rotation as hereinafter set forth. The bar C is desirably of angle-iron so that it may fit in the angles formed between the under sides of the ledges 4 and the vertical rear sides of the boxes B, as best shown in Fig. 8. For the purpose of shifting the body-frame upon the rear axle the body-frame is provided with a bearing or bearings for a rotary winding-shaft E, provided at its lower end with a worm or spirally-threaded drum 7, which said drum can, if desired, be formed by enlarging a portion of the shaft, or the drum can be formed separately and be secured upon the shaft in any suitable way. This winding-shaft is employed for operating a chain or link belt F, as in my said application, and as a preferred arrangement the chain or link belt passes about pulleys or sprockets 8, which are journaled in the upper and lower ledges or flanges 3 and 5 of the axle-boxes and also about pulleys or sprockets 9, which are arranged in front of the sprockets 8 and supported by bearings 10 that are carried by one or more cross-bars or cross-pieces of the body-frame, the said sprockets 8 and 9 being illustrated in dotted lines in Fig. 2.

The pulleys 9 may be dispensed with, but the pulleys 8, which are practically arranged at the rear corners of the body-frame, are essential, since by connecting the chain with the axle and carrying it about the sprockets 8 the body-frame with its boxes can be shifted along the rear axle when the hand-wheel is operated.

As a means for connecting the chain with the rear-axle I secure upon the latter a collar G, having a forwardly-projecting lug 11, to which the ends of the chain are attached by eyebolts 12. By such arrangement the eyebolts can be adjustably attached to the collar—for example, by nuts applied to threaded end portions of the eyebolts—and hence any slack in the chain can be readily taken up. The collar G is rigidly secured on the axle, and may be thus held upon the same by a set-screw, or by any other suitable means. This collar also affords a stop which prevents the axle from turning, but permits the body-frame and boxes to shift along the same, and to such end said collar is provided with a rearwardly-projecting lug or stop 13, arranged to bear against the bar C, as best shown in Figs. 3 and 4. By such arrangement the bar C can slide along the stop 13 on the collar, while at the same time the axle will be held against turning forward. This lug 13 is so formed as to present a vertical shoulder 14 on the rear portion of the collar to engage the vertical flange portion 15 of the bar C, and by this arrangement the axle is prevented from turning backward. With reference to the stop portions 13 and 14 of the collar, which engage the bar C, the latter may be regarded simply as an ordinary flat bar, but I prefer forming it of angle-iron, since by such arrangement the horizontal upper flange portion 16 of the bar can be bolted to the ledges 4 of the axle-boxes, as already described. The collar also affords a stop or tooth which can engage in any one of the notches 17 of a horizontally-arranged latch-bar H, employed for temporarily locking the body-frame on the rear axle—as shown, for example, in Figs. 6 and 7—wherein the upper portion of the collar is received within one of the notches of the latch or locking-bar. The locking-bar can be raised and lowered by a foot-lever I, arranged within reach of the foot of an attendant standing upon the rear platform 18 of the machine. Said locking-bar is steadied by guides 19, which are secured to the under side of the rear platform, as best shown in Fig. 3.

The upper axle-bearings 20, within the axle-boxes B, consist of metal blocks, which are held within the boxes by bolts 21 and formed with rounded lower sides. These blocks, while answering the purpose of rolls, are not liable to be broken away from the boxes, since they have broad flat top surfaces which abut against the flat under sides of the rear-end portions 2 of the side bars 1, which at such points form the top portions of the axle-boxes.

What I claim as my invention is—

1. The combination of the stop on the shifting rear axle with the cross-bar engaged by said stop.

2. The combination of the stop, rear axle, latch-bar H, and cross-bar.

3. The combination, with the shifting rear axle, of the notched latch-bar and a tooth or stop on the axle for engaging the latch-bar.

4. The combination, with the shifting rear axle, of the notched latch-bar and a foot-lever for operating the same.

5. The combination of the rear axle, the shifting body-frame, the collar G, secured to the axle, the cross-bar C, engaged by the collar, the chains F, attached to the collar, and means for operating the chain.

MORTON G. BUNNELL.

Witnesses:
HARRY C. KENNEDY,
CHAS. G. PAGE.